E. L. BARNES.
EXPANSION DEVICE OR SLIP JOINT.
APPLICATION FILED JUNE 20, 1919. RENEWED NOV. 8, 1920.
1,367,348.
Patented Feb. 1, 1921.
2 SHEETS—SHEET 1.
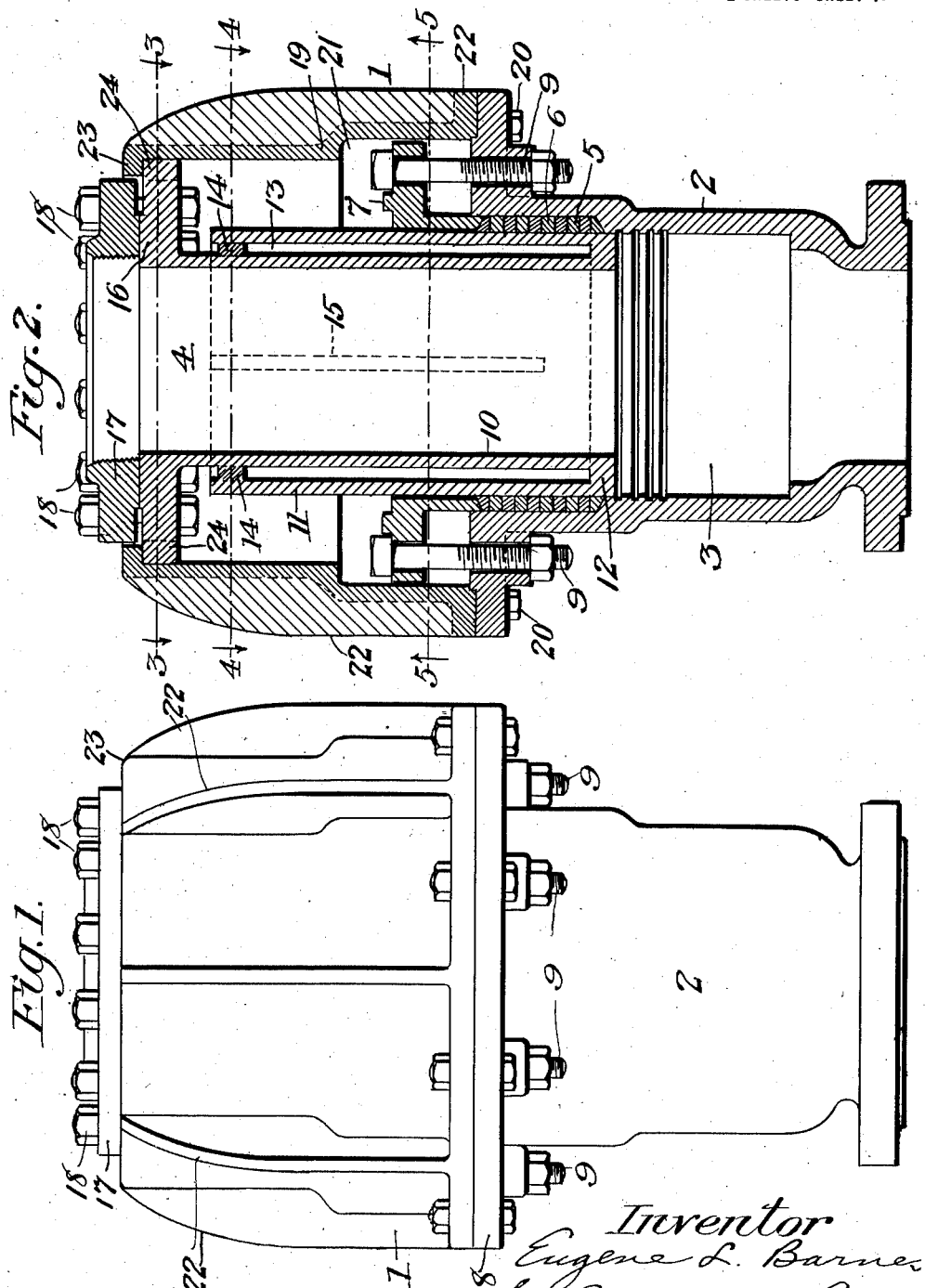

E. L. BARNES.
EXPANSION DEVICE OR SLIP JOINT.
APPLICATION FILED JUNE 20, 1919. RENEWED NOV. 8, 1920.
1,367,348.
Patented Feb. 1, 1921.
2 SHEETS—SHEET 2.
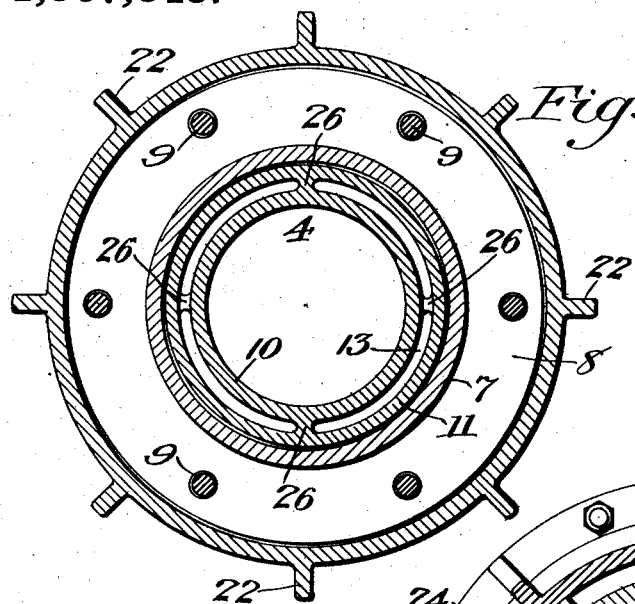
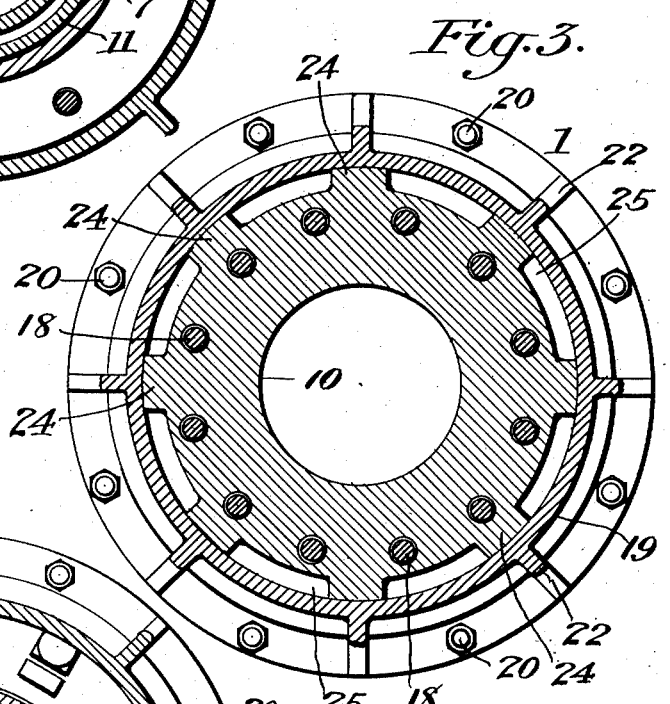
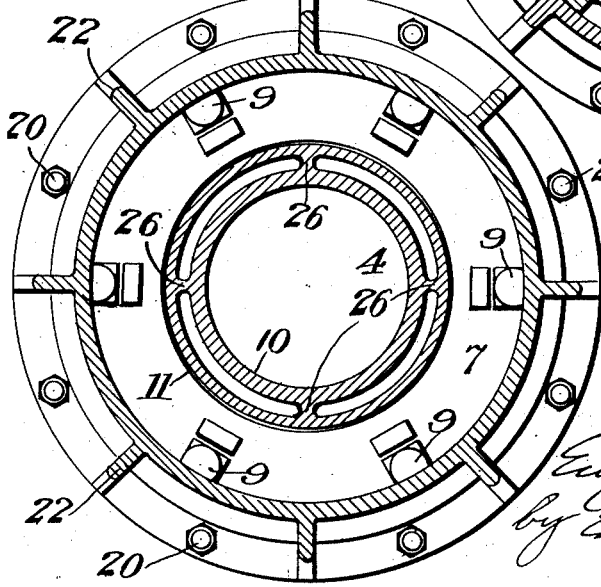
Inventor
Eugene L. Barnes
by Edmund H. Parry
Attorney.

UNITED STATES PATENT OFFICE.

EUGENE L. BARNES, OF BUFFALO, NEW YORK, ASSIGNOR TO AMERICAN DISTRICT STEAM COMPANY, OF NORTH TONAWANDA, NEW YORK, A CORPORATION OF NEW YORK.

EXPANSION DEVICE OR SLIP-JOINT.

1,367,348.   Specification of Letters Patent.   Patented Feb. 1, 1921.

Application filed June 20, 1919, Serial No. 305,476. Renewed November 8, 1920. Serial No. 422,687.

*To all whom it may concern:*

Be it known that I, EUGENE L. BARNES, a citizen of the United States of America, residing at Buffalo, in the county of Erie and State of New York, have invented certain new and useful Improvements in Expansion Devices for Slip-Joints, of which the following is a specification, reference being had therein to the accompanying drawing.

This invention comprises an expansion device or slip joint. While its application is unrestricted, it is especially useful in connection with steam and other systems where provision is made to take care of creeping, expansion or contraction of pipe lines.

In joints previously used for this purpose, it was customary to have an inner and outer sleeve slidably arranged with a packing between them. In other words, the outer portion of the inner sleeve had a bearing directly against the packing. The high temperature, when used with steam, had a tendency to char the packing causing it to deteriorate rapidly, thus producing leakage. One of the primary objects of the invention is to obviate this difficulty and to this end an insulated air space is provided between the outer surface of the inner sleeve and the packing. Provision is also made for a circulation of the outer air in and around the joint, thus insuring a cooling or substantial decrease in the temperature of that portion of pipe bearing directly against the packing.

It is also contemplated as an object of the invention to provide an inner sleeve of one kind of metal, say for instance, iron or steel, the outer portion of the sleeve or the portion which bears against the packing being made of a metal which will slide easily and present a smooth bearing surface, such as copper, brass or bronze.

Still another object of the invention is to provide a device of this character, wherein the sleeves will be accurately guided in their movement one with relation to another and restricted so that one may not slide out of the other.

Other objects and advantages will in part be apparent and in part be brought out more clearly in the description which follows.

Drawings illustrating an embodiment of the invention are hereto annexed, the following views being shown:

Figure 1 is a view in side elevation of an embodiment of the invention;

Fig. 2 is a view in vertical section of the same;

Fig. 3 is a view in transverse section on the line 3—3 of Fig. 2; and

Figs. 4 and 5 are similar views on the lines 4—4 and 5—5, respectively, of Fig. 2.

Referring specifically to the drawings, the reference-numeral 1 designates generally an expansion device or slip joint embodying my invention. It comprises an outer casing or sleeve 2 having an inner smoothly bored portion 3 for the reception of a coöperating sliding member designated generally by the numeral 4. In one end of this casing or sleeve 2 there is a gland 5 for the reception of packing 6. This is held in place suitably as by means of a packing ring 7 having a flange which coöperates with a similar flange 8 on the casing 2, these being drawn together as by bolts 9 to compress the packing. The sliding member 4 comprises an inner sleeve 10 and an outer sleeve 11 joined as at 12 and leaving between these members an insulated air space 13. The inner member 10 may be formed of a metal such as iron or steel, while the outer member 11 is preferably made of a metal which will make a smooth sliding bearing with the packing and smoothly bored portion 3 of the casing 2. This may be of such metals as brass, copper, or bronze. At the end opposite the point of connection of the inner and outer sleeves there are spacing blocks or the like 14, two of which are shown in section. These are arranged preferably on opposite sides of the sleeves and corresponding spacing members 15 are also provided, the latter being generally longer than the members 14. This is to provide for accurate spacing of the sleeves and also to permit air to circulate freely around the members 15 and out through the open end of the chamber between these two sleeves.

Means are also provided for accurately guiding and restricting the sliding movement of the member 4 within and in relation to the outer sleeve 2. To this end, the sleeve 10 is provided with a flange 16 and upon this flange there is disposed means for attaching it to a pipe line, the means herein shown being a threaded collar 17 secured to the flange 16 suitably as by bolts 18. Co-operating with the flange 16 there is a guiding member or casing 19 secured at one end to the flange 8 as by bolts 20 and having a recessed portion 21 for the accommodation of the packing ring 7. This casing 19 may be reinforced as by ribs 22 and has at its outer end an inturned flange 23 which acts as a stop to limit the outward movement of the flange 16.

In order to provide free circulation of air between the flange 16 and the inner surface of the casing 19, the flange has contact with the inner surface of the casing 19 through projections or the like 24, (Fig. 3) recessed portions 25 being thereby formed so that the air may freely pass the flange and enter the chamber 13 between the sleeves 10 and 11.

Instead of the arrangement of spacing blocks 14 and 15 between the inner and outer sleeves 10 and 11 as shown in Fig. 2, these sleeves may be joined together at certain portions as by fins or the like 26 shown particularly in Figs. 4 and 5.

When assembled, the outer sleeve 11 of the sliding member 4, being preferably formed of a smooth metal, has a bearing upon the packing 5 and the smooth inner surface 3 of the member 2. The inner sleeve 10, being in spaced relation to the sleeve 11, provides an insulated air space 13 which is in communication with the atmosphere through the recessed portions 25 of the flange 16. This insures a much less degree of heat upon the packing 5, when steam (for instance) is used than would be possible if the inner sleeve 10 had a bearing directly against the packing. The arrangement of the bolts 9, extending through the flange 8, permits an adjustment of the packing ring 7 without dismounting the device. The formation of the flange 23 upon the guiding sleeve 19 insures a proper guiding of the members of the joint and prevents complete withdrawal of one from the other.

From the foregoing, it will be apparent that the present invention provides a practical means of effecting the objects and producing the advantages enumerated. While it has been disclosed in the embodiment herein presented, it will be understood that it is not desired to limit the invention to the precise form of this disclosure, as many changes in the general arrangement may be made without departing from the spirit of the invention or its scope as set forth in the claim.

What I claim is:—

1. An expansion device comprising co-operating sliding members, and one of said members being provided with an insulating air space.

2. An expansion device comprising co-operating sliding members, and a portion of one of the sliding members being spaced apart from a portion of the other sliding member to constitute an air space between the members.

3. An expansion device comprising co-operating sliding members, one of said members being provided with an insulating air space, and means for guiding the members.

4. An expansion device comprising co-operating sliding members, one of said members being provided with an insulating air space, and means for restricting the movement of the members in relation to each other.

5. An expansion device comprising an outer casing, an inner sliding member co-operating therewith, said inner member having a portion in spaced relation to the inner member and bearing upon a portion of the outer casing to constitute, between the inner member and the casing, an air space.

6. An expansion device comprising an outer casing, an inner sliding member co-operating therewith, said inner member having a portion in spaced relation to the inner member and bearing upon a portion of the outer casing to constitute between the inner member and the casing an air space, the portion bearing against the outer casing being formed of a lubricating material.

7. An expansion device comprising an outer casing having a smooth internal bore, a sliding member associated with the casing and comprising an inner sleeve, an outer sleeve disposed on the inner sleeve in spaced relation thereto and in sliding engagement with the smooth inner portion of the outer casing, the space between the outer and inner portions of the sleeve constituting an air chamber, and a packing associated with said members.

8. An expansion device comprising an outer casing having a smooth internal bore, a sliding member associated with the casing and comprising an inner sleeve, another sleeve disposed on the inner sleeve in spaced relation thereto and in sliding engagement with the smooth inner portion of the outer casing, the space between the outer and inner portions of the sleeve constituting an air chamber, a packing associated with said members, and a guiding instrumentality for the members.

9. An expansion device comprising an outer casing having a smooth internal bore, a sliding member associated with the casing and comprising an inner sleeve, an outer sleeve disposed on the inner sleeve in spaced relation thereto and in sliding engagement with the smooth inner portion of the outer casing, the space between the outer and inner portions of the sleeve constituting an air chamber, a packing associated with said members, a guiding member associated with the sliding members, and means for effecting communication between the air chamber and the atmosphere.

10. An expansion device comprising coöperating sliding members, one of these members including a casing having a smooth bore, a second sliding member comprising an inner and outer sleeve connected at one portion and in spaced relation to each other to provide an insulated air space between the members, the outer member having sliding engagement with the inner portion of the outer casing, a packing associated with the casing and outer sliding member, said outer casing having a flange thereon, a guiding member disposed on said flange, said flange being provided with openings, a packing ring associated with said packing and having a flange thereon, and members secured to said flange and passing through the flange in the outer casing whereby the packing may be adjusted from outside the casing.

11. An expansion device comprising coöperating sliding members, one of these members including a casing having a smooth bore, a second sliding member comprising an inner and outer sleeve connected at one portion and in spaced relation to each other to provide an insulated air space between the members, the outer member having sliding engagement with the inner portion of the outer casing, a packing associated with the casing and outer sliding member, means for adjustably retaining the packing between these members, said outer casing having a flange thereon, a guiding member disposed on said flange, said flange being provided with openings, and means for maintaining the inner and outer sleeves in spaced relation.

12. An expansion device including a plurality of associated sliding members, one of said members comprising two portions spaced apart to constitute an annular airspace.

13. An expansion device including a plurality of associated sliding members, one of said members comprising two portions spaced apart to constitute an annular airspace, and a packing encompassed by one of said members and juxtaposed to the airspace of the other member.

14. An expansion device comprising a member adapted to be connected to a pipeline, a second member slidable in the first member and provided with an air-space or containing chamber, a packing encompassing the air-chamber and disposed between the two members, and means for controlling the relative movement between the members.

15. An expansion device comprising two members adapted to have relative sliding movement, one of the members being encompassed by the other member and formed with an annular air-chamber, a packing encompassing the air-chamber and disposed between the bearing walls of the two sliding members, and means for guiding and limiting the sliding movement of the members.

In testimony whereof I affix my signature in presence of two witnesses.

EUGENE L. BARNES.

Witnesses:
HOWARD E. LONG,
GEORGE H. WEST.